OR 3,195,041 [redacted] EXAMINER

260

July 13, 1965 F. M. MAYES 3,195,041

BORE HOLE LOGGING APPARATUS INCLUDING MEANS FOR REPRODUCING A MULTIPLEXED LOG RECORD

Filed March 5, 1962 3 Sheets-Sheet 1

INVENTOR.
FRED M. MAYES

BY Busser, Smith & Harding

ATTORNEYS

INVENTOR.
FRED M. MAYES
BY

ATTORNEYS

INVENTOR.
FRED M. MAYES
BY
Busser, Smith & Harding
ATTORNEYS

United States Patent Office 3,195,041

Patented July 13, 1965

3,195,041

BORE HOLE LOGGING APPARATUS INCLUDING MEANS FOR REPRODUCING A MULTIPLEXED LOG RECORD

Fred M. Mayes, Richardson, Tex., assignor to Sun Oil Company, Philadelphia, Pa., a corporation of New Jersey Filed Mar. 5, 1962, Ser. No. 177,625

17 Claims. (Cl. 324—1)

This invention relates to bore hole logging apparatus and particularly to apparatus for recording electric logs.

Prior methods for magnetic recording of electric logs have used a separate logging amplifier and tape channel for each of the various signals to be recorded, such form of apparatus being described in the application of Fred M. Mayes and Jack Weir Jones, Serial No. 818,066, filed June 4, 1959.

Also, the surface playback equipment has generally involved a separate channel for each record, as is disclosed in the application of John D. Bennett, Preston E. Chaney, Fred M. Mayes, and Jack Weir Jones, Serial No. 54,695, filed September 8, 1960. This invention is directed to multiplexing apparatus for reducing the number of channels required in both the recording and playback equipment.

An advantage of the apparatus in accordance with this invention is in the saving of apparatus and power. Another advantage is that it is possible to use wire as the recording element instead of tape. Wire takes up less space and is a more efficient recording medium than tape, in the sense of carrying more information per unit volume, so that by increasing the cycling rate a greater amount of the hole can be logged with the same volume of recording medium. Furthermore, wire is quite insensitive to high bore hole temperatures which would destroy tapes of materials otherwise acceptable.

The saving of power in the down hole apparatus results from the omission of multiple amplifiers and by reason of the fact that the oscillator does not have to supply power to the earth and the chopper at the same time, as will become apparent hereinafter. Also, it is not necessary to filter out the A.C. current from the self-potential input since there is no alternating current in the ground while the self-potential recording is being made as was the case with the apparatus of the Mayes and Jones application. With respect to the playback apparatus, the multiplexing apparatus in accordance with this invention involves a considerable reduction of the elements necessary for providing the playback recording.

The general object of the present invention is the provision of an improved apparatus for bore hole logging and for playback of the log which apparatus involves a simpler construction than the apparatus disclosed in said earlier applications. The object of the invention may be more easily appreciated from consideration of the following disclosure, but may generally be said to relate to the reduction in the number of channels required in both the recording and playback equipment. The objects of the invention are accomplished by the provision of multiplexing apparatus as is more fully described hereinafter.

The foregoing and other objects of the invention will become apparent from the following description read in conjunction with the accompanying drawings, in which.

Figure 1:
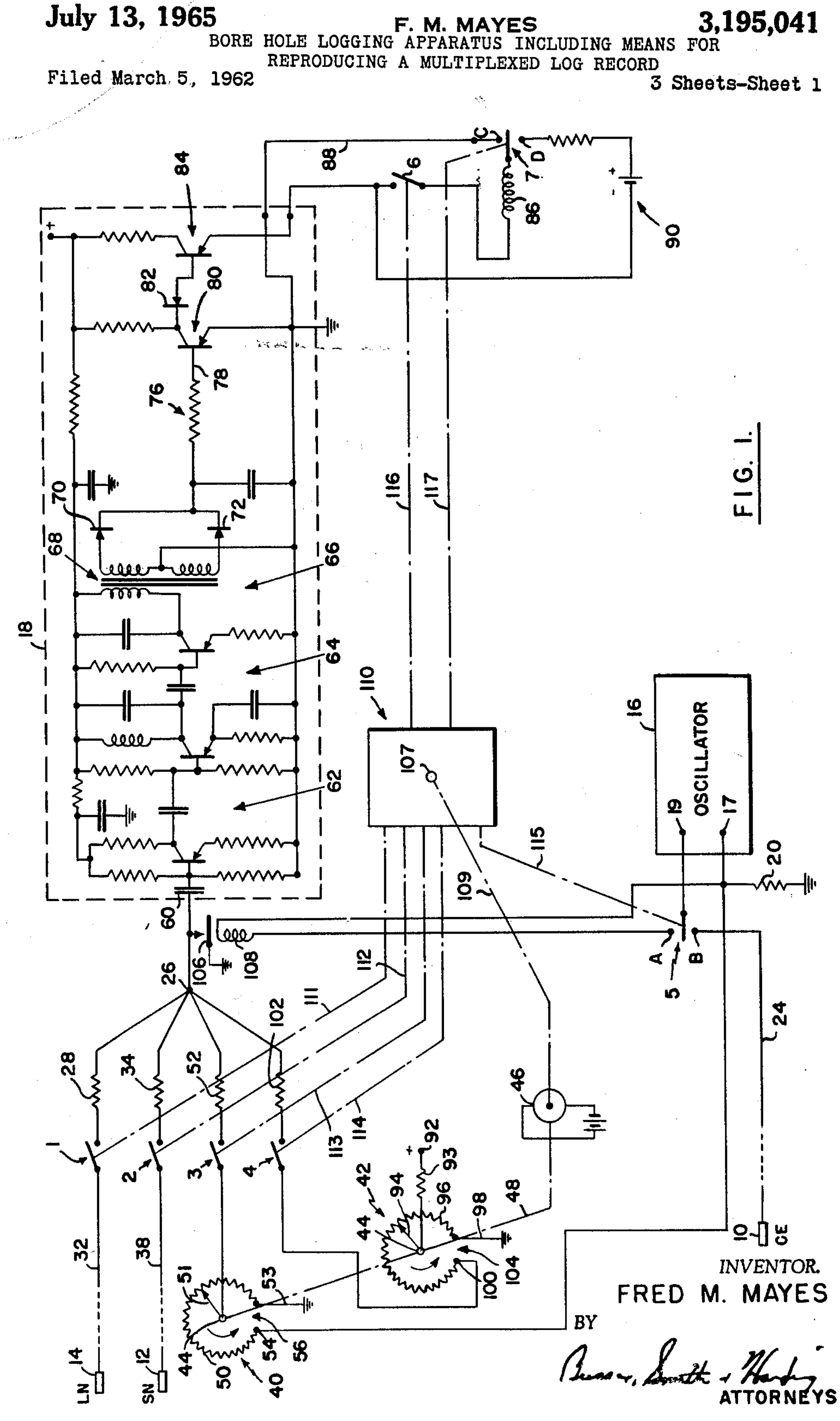
FIGURE 1 is a wiring diagram showing the circuitry for a recording apparatus provided in accordance with this invention.

Reference will first be made to the bore hole logging and recording apparatus illustrated in FIGURES 1 and 2. In logging apparatus such as that described in the aforementioned Mayes and Jones application, many electrode configurations may be used. However, the following description will be consistent with the use of three electrodes as indicated in the drawing. The electrode assembly is fundamentally a multi-conductor insulated electrical cable along which the electrodes are exposed to bore hole liquid. This cable projects downwardly from the casing enclosing elements of the logging apparatus and may extend through and from a jet opening in a bit as described in said Mayes and Jones application. The lowermost electrode 10 is illustrated as the current electrode through which current is introduced into the earth. The next electrode 12, which is typically about sixteen inches above the current electrode, is shown as the short normal electrode. A third electrode 14 may be typically about sixty-four inches from the current electrode and is shown as the long normal electrode, this electrode along serving as a self-potential electrode. These electrodes are quite remote from the bit and the lower end of the supporting assembly and may be of the order of twenty feet or more distant from the bit during logging. As will become evident hereinafter the described electrode configuration is quite arbitrary, and the invention is applicable to many other electrode configurations.

An oscillator 16 and amplifier 18 of this apparatus are generally of the type disclosed in said Mayes and Jones application, power being supplied thereto by a suitable power and control assembly such as that disclosed therein. Accordingly, details of this apparatus will not be disclosed herein, reference being made to said application for details of construction and operation both of the apparatus per se and of the logging procedure. The logging amplifier 18 is of the type which delivers a positive curent pulse to the recording head at minimum input signals.

The oscillator supplies alternating current through the current electrode 10 and the drill stem (ground). The frequency of this alternating current may be quite arbitrarily chosen, but it has been found desirable for most logging operations to utilize a frequency of the order of 400 cycles per second. The constants of the circuit are chosen to give a maximum and stable output at this frequency. One output terminal 17 of oscillator 16 is connected to ground through a resistance 20 and the other oscillator output terminal 19 is connected to the current electrode 10 through a switch 5 and cable conductor 24. The switch 5 is selectively engageable with contacts A or B, the connection to the current electrode being completed when the switch 22 engages contact B.

The input terminal 26 to the amplifier 18 is connected to the long normal electrode 14 through an adding resistor 28, a switch 1 and a cable conductor 32. The terminal 26 is connected to the short normal electrode 12 through an adding resistor 34, a switch 2 and a cable conductor 38.

A pair of potentiometers 40 and 42 are provided and are contained in a single housing. The wiping contacts of the potentiometers 40 and 42 are driven in synchronism by a common shaft indicated at 44. The drive means for the potentiometers 40 and 42 is indicated at 46 and comprises a battery-powered drive motor. The connection between this drive means and the shaft 44 is indicated at 48. The wiping contact 51 of potentiometer 40 is connected to the terminal point 26 through a switch 3 and an adding resistor 52. During the logging operation, the wiper 51 of the potentiometer 40 rotates continuously at a rate which may be of the order of several revolutions per second. The potentiometer resistance at 50 has one of its terminals grounded at 53 and its other terminal 54 connected to the output terminal 17 of the oscillator 16. A gap 56 exists between the ends of the potentiometer resistance.

At this point it is desirable to analyze the nature of the signals provided at terminal point 26 during a logging operation. Let it be assumed that during a certain half cycle one terminal of the oscillator outpue is positive relative to the other terminal and that the ground, constituted by the drill pipe, is at zero potential. In this case, the oscillator terminal 19 connected to the current electrode 10 is positive so that at a corresponding time the electrodes 12 and 14 will pick up a positive signal. Under these same conditions the oscillator terminal 17 connected to terminal 54 of the potentiometer resistance 50 will be negative with respect to ground, the other terminal of the resistance 50 being grounded, so that at any point of the resistance the potential is negative with respect to ground. The wiper accordingly picks up during its movement along resistance 50 a signal which is always negative. Accordingly, the in-phase signals delivered to terminal 26 are respectively positive from the electrodes 12 and 14 and negative from the wiper of potentiometer 40. Adjustment of the circuit constants is such that the negative potential picked up by the wiper 51 ranges from zero to a potential which in magnitude exceeds that received from the electrodes 12 or 14. Accordingly, during a rotation of the potentiometer wiper a position is reached in which the in-phase potential at terminal 26 passes through zero and changes its phase by 180°. The total signal, including incidental quadrature components, reaches a very low minimum value. During this operation, either switch 1 or switch 2 is closed and switch 5 is in position B.

The signals appearing at terminal 26 are delivered to the amplifier through a capacitor 60 (blocking direct current signals) to a multistage amplifier constituted by the three stages 62, 64 and 66 of conventional transistor type utilizing npn transistors. The output of these stages is provided to the transformer 68.

The amplification effected through the transistor stages 62, 64 and 66 is such that, except during a quite short interval during which the input at 26 passes through a low amplitude value, the transistor stage 66 is saturated. Accordingly, the transformer 68 receives a wave of substantially constant high magnitude during operation except when the input at 26 passes through its minimum value, the wave reversing phase at the minimum. The secondary of the transformer 68 feeds the full wave rectifier comprising the rectifying diodes 70 and 72 to provide at 78, through the low pass filter 76, a high positive potential except when the input at 26 passes through its minimum, the result being a negatively directed pulse relative to a high positive value at that time. The connection 78 is to the base of the transistor 80 and this transistor is conducting except at the time of the minimum potential at 26. The collector of the transistor 80 is connected to the cathode of the Zener diode 82, the anode of which is connected to the base of the transistor 84, in the emitter circuit of which is the coil 86 of the recording head which serves to record signals on the recording medium. This circuit arrangement is such that the transistor 84 conducts and provides a recording positive current in the coil 86 only when the transistor 80 is nonconducting. The Zener diode and the transistors associated therewith provide pulse shaping in such fashion as to record a short pulse on the magnetic tape at the time the terminal 26 passes through its minimum potential value. It may be noted that the current arrangement is such that during the passage of the potentiometer wiper 51 across the gap 56 there is a substantial continuity of the saturation condition of the stage 66, due to the electrode potential, so that the recording of a pulse of the winding 86 occurs only under the conditions stated.

The emitter circuit of transistor 84 is connected to the recording coil 86 through a switch 6. The other end of the recording head 86 is connected to ground through a switch 7 and a connector 88. The switch 77 is selectively engageable with the contacts C and D. It will thus be apparent that only when the switch 6 is closed and when the switch 7 engages contact C will the recording head 86 be operable to effect recording. The negative terminal of a battery 90 is connected to the contact D through a resistor. The positive side of battery 90 is connected through switch 6 to the recording head 86. Thus, with switch 6 closed and with switch 7 engaging contact D a pulse is provided from th ebattery through the recording head. As will be described hereafter switches 6 and 7 will be operated to provide a synchronizing pulse through the recording head 86.

A positive supply terminal 92 is connected through a resistor 93 to the rotating wiper 94 of the potentiometer 42, the resistance 96 of which has one terminal grounded at 98 and the other terminal 100 connected to the terminal 26 through a switch 4 and an adding resistor 102. A gap 104 exists between the terminals 98 and 100. Resistor 93 is large in comparison with the resistance of potentiometer 42 so that the change in potential at 100 will be nearly a linear function of the rotation of potentiometer wiper 94. As previously noted, the potentiometer 42 is arranged to rotate in unison with the potentiometer 40 and ground contacts are simultaneously made. In view of the type of operation which is desired and which has been described to secure the zero cycle indication, the wiper 94 desirably leaves the terminal 100 at the latest before the wiper 51 leaves the terminal 54. The potentiometer 42 will be referred to as the self-potential potentiometer and for refinements of the circuitry reference is made to the Mayes and Jones application. For example, a balancing network may be involved between the terminal 100 and the switch 4, the balancing network providing a fixed potential which, in a sense, is algebraically subtracted from the detected potential to eliminate to a considerable extent the background component of the potential which will ordinarily remain reasonably constant throughout a considerable length of the bore hole. During a logging operation, the rotation of wiper 94 provides a variation of input potential to the terminal 26, which, for measuring, is caused to balance the earth potential to provide a zero input at 26 to the recorder amplifier. In order to secure the advantages of alternating current amplification, the direct signal at 26 is chopped by means of the chopper contact 106 which is vibrated by the winding 108 energized from the output terminals of the oscillator 16, the switch 5 being in engagement with the contact A during this operation.

It will be noted that during the logging operation wherein either one of the electrodes 12 or 14 is connected to the input 26 along with either one of the potentiometers 40 and 42, the operation is substantially the same.

During this operation, a short pulse is recorded when the input at the terminal 26 is a minimum.

Figure 2:
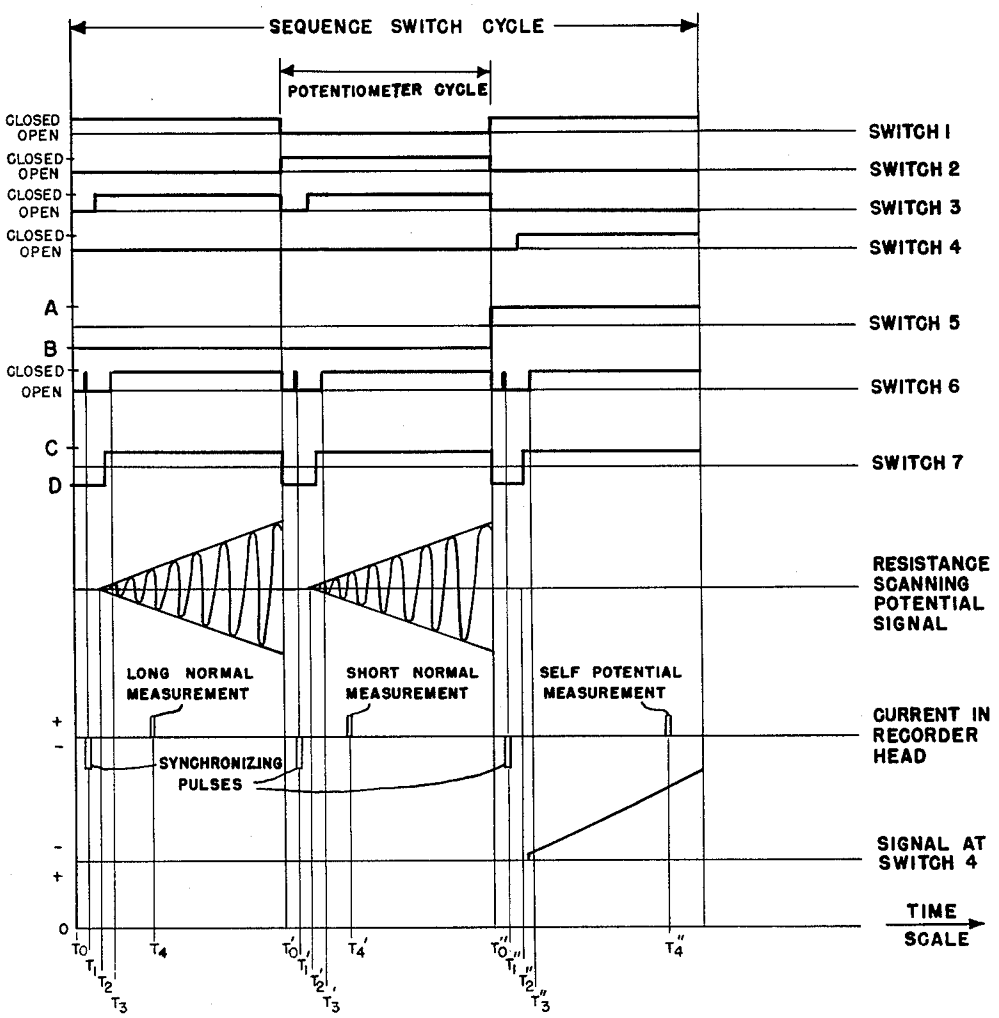
FIGURE 2 is a schematic illustration of the operation of the circuit shown in FIGURE 1.

A sequencing switch means indicated schematically at 110 is provided for operating by cam action the switches 1 to 7 in the desired sequence for effecting the mode of operation indicated in FIGURE 2. The drive shaft for the sequencing switch means 110 is indicated at 107 and is connected through the connection 109 to the drive motor 46. The motor 46 is operable, through suitable gearing, to cause the sequencing switch 110 to make one complete cycle for each three revolutions of the rotating contacts of the potentiometers 40 and 42. The operating connection between the sequencing switch 110 and the switches 1, 2, 3, 4, 5, 6 and 7 are indicated schematically at 111, 112, 113, 114, 115, 116 and 117, respectively. The sequencing switch 110 may be of any type well known in the art and may involve either mechanical switching by cam action or switching by means of relays.

The sequencing switch is set up to cause the sequence of operation indicated in the graphical representation of FIGURE 2. Referring now particularly to this figure, the operating sequence of the circuit shown in FIGURE 1 will now be described. The general operation involves successive scanning cycles for recording on the recording medium the long normal signals, the short normal signal and the self-potential signals which sequence is successively repeated.

Considering the operation of the circuit starting at time $T_0$, the switch 1 is closed to connect the amplifier input to the long normal electrode 14 through the adding resistor 28. At this time the switch 5 is in the position B so that current from the oscillator 16 flows through the current electrode 10. Oscillator 16 also delivers its output to the scanning potentiometer 40. Let us assume that at this time the scanning potentiometers have just entered the dead zone so that they supply no signal. As shown in FIGURE 2, the switch 7 is in engagement with the terminal D so that the recording head 86 is ready for a synchronizing signal and no signal from the amplifier may be recorded on the tape in this position.

At the time $T_1$, which corresponds to the time when the rotating contacts 51 and 94 are in the center of the dead zone of the scanning potentiometers, switch 6 makes a momentary contact. This causes a short negative current pulse to flow through the recording head 86 by the circuit including battery 90. Because of its polarity, this signal may be distinguished from the regular measuring signals on the recording medium which occur when the logging amplifier output reaches a minimum. Referring to FIGURE 2 the synchronizing pulses are illustrated as extending in a negative sense from the zero reference line for the current in the recording head. The pulses representing the signal from the electrodes are indicated as extending in a positive sense from this reference line as is shown in FIGURE 2. By reason of the momentary contact and then the breaking of the switch 6, the synchronizing indication will be in the form of a pulse.

At the time $T_2$, each scanning potentiometer makes contact at the end of the resistance whereupon a zero signal component will be supplied to the amplifier from the scanning potentiometers. At this time and for a short time thereafter, the signal to be measured will be larger than the scanning potentiometer signal so that the amplifier output will not be at a minimum, wherefore there will be no signal to the recording head 86. In order to avoid the production of a spurious pulse due to switching transients at the beginning of a cycle, switch 3, which connects the signal from the scanning potentiometer 40 to the input adding resistor 52, is closed at the time $T_2$ so that amplifier transients are over before switches 6 and 7 are closed to permit recording. The potentiometer signal variation is illustrated in FIGURE 2, the scale of which is not exact but is merely for illustration purposes.

At the time $T_3$, or preferably a short time prior to this, switch 6 closes, and switch 7 completes the recording head circuit to record the amplifier output by movement into engagement with grounded contact C. Thus, at this time, the amplifier is ready to record the minimum signal input for the long normal signal as a sharp positive pulse through the recording head. As shown in FIGURE 2, this pulse occurs at the time $T_4$. Because the resistance of the scanning potentiometer 40 varies linearly, the interval between the synchronizing pulse and the long normal pulse is a measure of the magnitude of the potential picked up by the long normal electrode. To avoid spurious pulses due to switching transients at the end of the cycle, switch 6 may be opened slightly before wiper 51 leaves terminal 54. This, of course, applies to each succeeding cycle.

A new scanning potentiometer cycle begins at a time $T_0'$ as is indicated in FIGURE 2. As will be apparent, this cycle is utilized for the measurement of the short normal signal. As is indicated in FIGURE 2, this cycle of operation is the same as the cycle of operation for measuring the long normal signal with the one exception that the switch 2 is closed instead of the switch 1. Thus, the signals from the short normal electrode 12 are delivered to the input terminal 26 for the amplifier 18. The cycle of operation for measurement of the short normal curve also provides a synchronizing pulse at the time $T_1'$ which corresponds to the time $T_1$ in the previous cycle. Also, at a time indicated at $T_2'$ the scanning potentiometer provides a zero signal to the amplifier and that a time $T_3'$, which corresponds to the time $T_3$ in the previous cycle, the switch 6 closes to connect the recording head to the output of the amplifier. At time $T_4'$ a sharp positive pulse is provided through the recording head 86 by reason of the output from the amplifier 18 which is indicative of a minimum input signal to the amplifier.

A third scanning cycle begins at the time $T_0''$ as is shown in FIGURE 2. In this cycle of operation the self-potential voltage is to be measured. At this initial time, the switch 5 is operated into engagement with terminal A so that the output of the oscillator 16 is delivered to the chopper coil 108 instead of to ground through the current electrode 10. It is noted that switch 1 is closed during this cycle of operation so that the long normal electrode 14 is used for the self-potential measurement. In this cycle of operation the potentiometer 40 is used for the self-potential measurement to provide the direct current comparison voltage. As illustrated in FIGURE 2, the time $T_1''$, $T_2''$, $T_3''$ and $T_4''$ correspond to the previous times having the same subscript. In this cycle of operation the rotation of the wiper 94 provides a variation of input potential to the terminal 26 which, for measuring, is caused to balance the earth potential to provide a zero input to the recorder amplifier 18. In the case of self-potential recording, the direct signal at 26 is chopped by means of the chopper contact 106 in order to secure the advantages of alternating current amplification.

As the sequencing switch 110 and the potential wipers 51 and 94 are continuously rotated by the driving means 46 to effect the above described cycle of operation, a continuous record comprising the synchronizing and measuring pulses, the latter in sequence, is accumulated. By means of techniques used in the art of bore hole logging, log curves derived from these pulses are utilized for the determination of characteristics of the bore hole.

The long normal and short normal record obtained by the above procedure comprises a plurality of pulses whose phase position relative to a synchronizing pulse is dependent on the ratio of the potentials to the current introduced into the earth, and consequently, valid and interpretable records may be secured in view of the fact that the electrical configuration presented by the earth is linear. It will be evident that the record obtained in this fashion is not directly readable for interpretation purposes and must be translated into a visual record.

Apparatus for providing a visual record of the desired type from a log of three separate channels is described in the aforementioned application of Bennett, Chaney, Jones and Mayes. The present invention is directed to apparatus for modifying this apparatus for use with a single channel multiplexed record. This apparatus will be referred to as a playback apparatus.

The present apparatus utilizes a playback amplifier similar to those used multiply in said prior mentioned application. However, the present apparatus requires only a single playback amplifier whereas the previous apparatus requires a plurality of amplifiers, one for each channel. As in the previous apparatus, in accordance with the recorded signal on the tape, the playback amplifier provides synchronizing pulses for triggering a sawtooth generator and sampling pulses for sampling the sawtooth wave for display on a visual record. In addition, the present invention involves the further use of the synchronizing pulses for operating a stepping switch for sequentially connecting the sampling pulses to three sampling relays which are consequently operated in sequence by the sampling pulses representing the long normal, the short normal and the self-potential measuring pulses.

Figure 3:
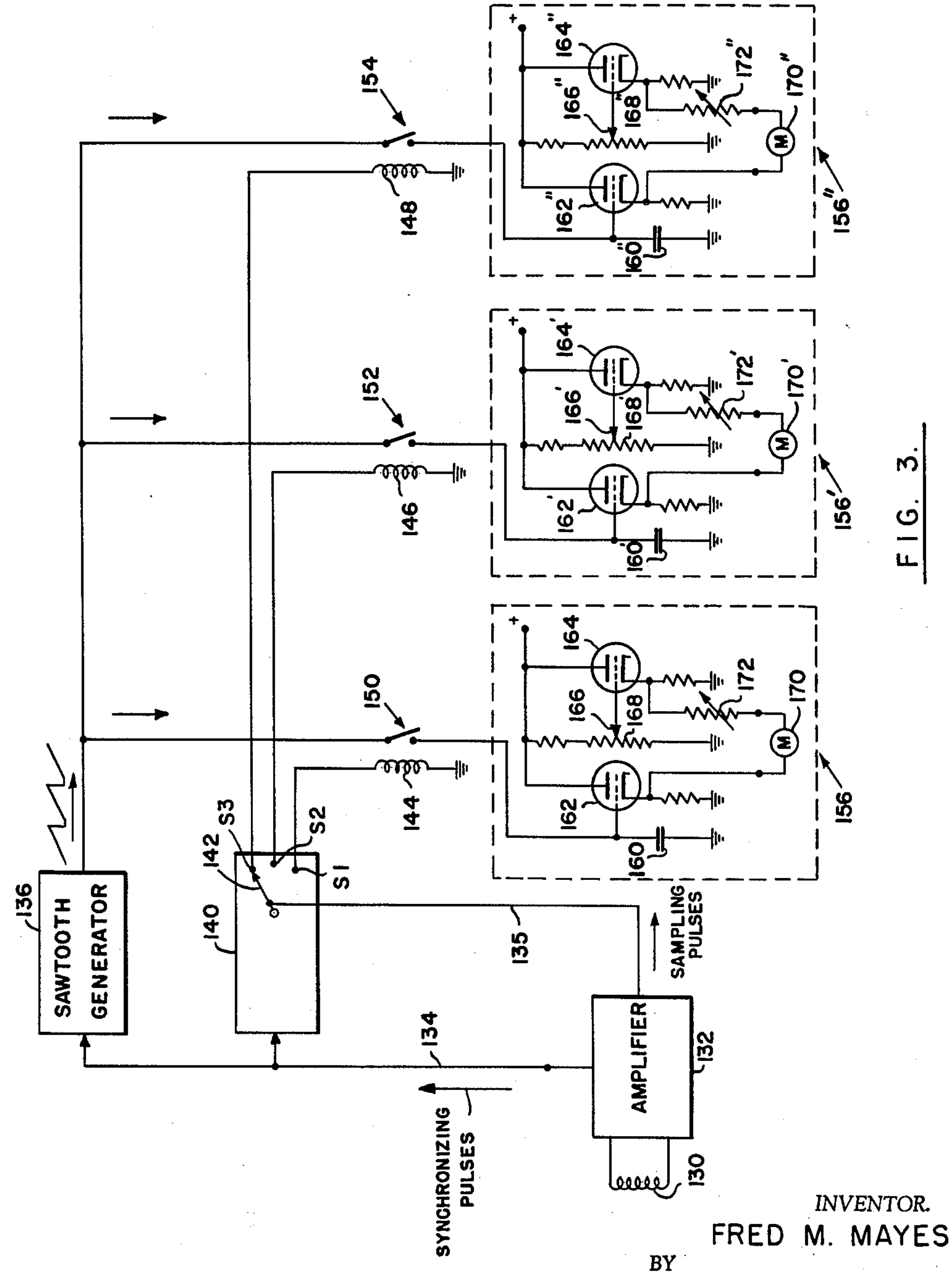
FIGURE 3 is a wiring diagram showing the circuitry for a playback apparatus provided in accordance with this invention.

Referring to FIGURE 3, there is indicated at 130 a conventional pickup head for picking up the synchronizing and measuring pulses from a single channel record. The input from the reproducing head 130 is delivered to the playback amplifier 132. Since the recorded synchronizing pulses are negative and the measuring pulses are positive, the amplifier 132 is arranged to distinguish between negative and positive inputs and to provide an output pulse to a conductor 134 in response to receiving an input of a negative synchronizing pulse and to provide an output to a conductor 135 in response to receiving an input of a positive measuring pulse. The amplifier 132 delivers synchronizing pulses through conductor 134 to a sawtooth generator 136 of a type, such as the one described in said prior mentioned application, in which the synchronizing pulse from the amplifier is delivered to the grid of a thyratron connected in a conventional circuit to cause firing thereof and thus triggering of the sawtooth generator 136 which provides a sawtooth wave as shown in FIGURE 3. The synchronizing pulses are also transmitted to a stepping switch means 140, which is responsive to the pulses to place sequentially a switch contact member 142 of the stepping switch 140 in contact with contacts S1, S2 and S3, respectively, or corresponding contacts similarly connected. The cycle of the stepping switch is continuously repeated in response to the synchronizing pulses with the contact 142 moving from contact S3 to contact S1 for repetition of the cycle.

Figure 4:
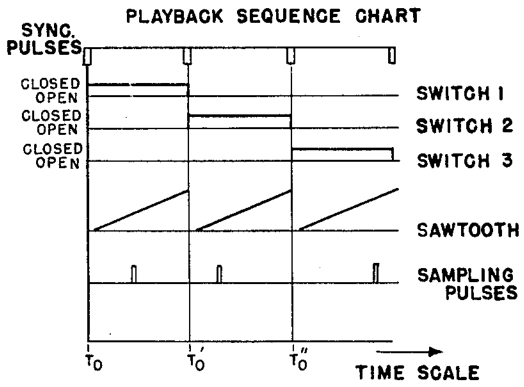
FIGURE 4 is a schematic illustration of the operation of the circuitry shown in FIGURE 3.

The amplifier 132 also provides sampling pulses through the stepping switch 140 by reason of the connection of conductor 135 with contact member 142, the latter being connectable with three sampling relays 144, 146 and 148 which are used, respectively, for the long normal measurement, the short normal measurement and the self-potential measurement. The apparatus is set up so that when the long normal measurement is being picked up by the reproducing head 130, the switch member 142 is in contact with contact S1 to deliver the sampling pulse to the relay 144, there being a corresponding operation of relays 146 and 148 in the case of the short normal and self-potential measurements, respectively. The sequential operation is more fully illustrated in the graphical representation in FIGURE 4.

The sawtooth wave is transmitted to the movable contacts of switches 150, 152 and 154 which are, respectively, the relay contacts for the long normal, the short normal and the self potential measurements. The contacts of switches 150, 152 and 154 are movable to a closed position in response to energization of the sampling relays 144, 146 and 148, respectively, by the sampling pulses. In response to the momentary closure of the switches 150, 152 and 154 a sample of the sawtooth wave is delivered to recording means indicated generally at 156, 156′ and 156″, respectively. Since the circuit for each of the recording means is identical and like parts have been given like reference numerals with corresponding primed designations, only one recording means need be described, the long normal recording means 156 being chosen for purposes of illustration. The short normal recorder means 156′ and the self-potential recording means 156″ operate in a manner similar to the long normal recording means 156.

Referring to the recording means 156, the fixed contact of the long normal sampling switch 150 is connected to one terminal of a capacitor 160 the other terminal of which is grounded. A triode 162 is arranged as a cathode follower as is the case with another triode 164, the grid of which is connected to the contact 166 of a potentiometer 168 connected between the positive supply terminal and ground. Between the cathodes of the triodes 162 and 164 there is connected the recording galvanometer element 170 in series with an adjustable resistor 172. The adjustment of potentiometer contact 168 serves for zero setting of the galvanometer element while the adjustment of resistor 172 serves as a sensitivity control. The galvanometer elements 170, 170′ and 170″ of the three recording means 156, 156′ and 156″ provide traces of the long normal, short normal and self-potential signals, respectively.

Considering the operation of the playback apparatus, starting a time $T_0$ (FIGURE 4) the recording head 130 senses on the record medium the synchronizing signal at the start of the long normal measurement whereby the amplifier 132 transmits a synchronizing pulse through connector 134 to the stepping switch 140 to cause a stepping movement of contact 142 into contact with the switch contact S1. This synchronizing pulse is also delivered to the sawtooth generator 136 to trigger the same to initiate a sawtooth wave form which is delivered to the movable contact members of the switches 150, 152 and 154. At time $T_4$ (FIGURE 4), the long normal measurement signal is picked up by the pickup head 130 and the amplifier 132 delivers a sampling pulse through stepping switch 140, by way of contacts 142 and S1, and through the relay 144. Relay 144 thus causes momentary closure of switch 150 to cause a sampling of the sawtooth wave form appearing at the movable contact thereof. The sample of the sawtooth thus produced charges the capacitor 160, which is of a small capacitance, to the sawtooth potential at that time, and since the potential of the capacitor 160 continues constant thereafter, the cathode followers 162 and 164 provide a current between their cathodes deflecting the recording galvanometer 170 to an extent measuring the magnitude of the original logged potential. Thus, there is provided at galvanometer 170 a signal the amplitude of which corresponds to the signal amplitude picked up by the long normal electrode during logging.

The operation of the short normal and self-potential circuits is similar to that of the long normal circuit described above and is schematically illustrated in FIGURE 4. At time $T_0'$ a synchronizing pulse is delivered through connection 134 to switching means 140 to effect movement of movable contact 142 into contact with switch contact S2. The synchronizing pulse is also delivered to the sawtooth generator 136 to trigger the same to produce a sawtooth wave form. At time $T_4'$ which corresponds to the time at which the playback head picks up the short normal measurement signal, a sampling pulse is delivered from amplifier 132 through the switching means 140 by way of contacts 142 and S2, and through the relay 146. Relay 146 thus causes a momentary closure of switch 152 to cause sampling of sawtooth wave form appearing at the movable contact of switch 152. The recording circuitry 156′ provides through galvanometer 170′ a signal whose amplitude corresponds to the signal amplitude picked up by the short normal electrode during logging. The sample of the sawtooth produced is delivered to the recording means 156′ which provides a current to deflect the galvanometer 170′ as previously described.

At time $T_0''$ a synchronizing pulse is delivered through connector 143 to the switching means 140 to cause a stepping movement at contact 142 into contact with switch contact S3. The synchronizing pulse is also delivered to sawtooth generator 136 to trigger the same, a sawtooth wave being delivered to the movable contact of switch 154. At a time $T_4''$, which occurs at an interval from time $T_0''$ that corresponds to the spacing on the record medium between the synchronizing pulse and the self-potential measurement signal, a sampling pulse is delivered from the amplifier 132 through switching means 140 by way of contact 142 and contact S3, through the relay 148. Relay 148 thus causes momentary closure of switch 154 to cause sampling of the sawtooth wave form appearing at the movable contact of switch 154. The sample of the sawtooth is delivered to the recording means 156″ which provides a current to deflect the recording galvanometer 170″. The signal provided through this galvanometer 170″ has an amplitude which corresponds to the amplitude picked up during the self-potential measurement.

It is apparent that the only clear way in which the channels may be distinguished is by the sequence and by a knowledge of the general character of the various quantities to be recorded. For logging applications this is adequate since the character of the various functions to be recorded is usually quite distinctive. For more general applications, an identification and calibration channel should be provided. This would take the form of a fourth sequential record on the recording medium derived from another input which might be for simplicity a fixed and known potential on a fourth cycle added to timer 107. The sequence of measurements would then be (1) long normal, (2) short normal, (3) S.P., (4) calibration, (5) long normal, etc. Addition to FIGURE 3 of a circuit 156‴, an additional sampling relay and an additional switch contact on 142 would also be required. By monitoring a galvanometer 170‴ disturbance in the desired sequence could be quickly detected, and it would also be possible to correct for tape speed variations, etc., on all channels by adjusting the slope of the sawtooth generator 136 to produce the proper deflection on 170‴.

It will be apparent that the playback apparatus in accordance with this invention is much simpler than that described in the application of Bennett, Chaney, Jones and Mayes since there is a considerable elimination of mechanism because there need only be one playback amplifier.

In accordance with the procedures in the art, the multiplexed log record may be reproduced as it is being made or the record may be reproduced after completion of the logging operation.

It will be evident that various details of construction and operation may be modified without departing from the invention as defined by the following claims.

What is claimed is:

1. Apparatus for the logging of bore holes comprising means for providing an exciting current to the earth in the vicinity of the apparatus, means for providing a first potential responsive to said exciting current, means providing a second potential responsive to said exciting current, means providing a third potential which varies cyclically and has, during each cycle of variation, the same predetermined wave form, means sensitive to a predetermined relationship during each cycle of variation between said third and first potentials and between said third and second potentials, means controlled by said sensitive means for recording the phase relationship of said predetermined relationships occurring in each cycle of variation to a cycle of variation of said third potential in the form of a pulse time modulated record, and means for connecting said first and second potentials sequentially to said sensitive means whereby said recording means sequentially records each of said predetermined relationships.

2. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle of variation, the same predetermined wave form, means for adding said first and second potentials individually in opposed relationship with said third potential to provide a resultant signal having magnitude which passes through a substantially zero value during said cycle of variation, said adding means including means for selectively connecting said first and second potentials individually in adding relationship with said third potential during a cycle of variation of said third potential means, recording means, and means for receiving said resultant signals and delivering a signal to said recording means upon the occurrence of a substantially zero resultant signal.

3. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle of variation, the same predetermined wave form, means for adding said first and second potentials individually in opposed relationship with said third potential to provide a resultant signal having magnitude which passes through a substantially zero value during said cycle of variation, said adding means including means for sequentially connecting said first and second potentials individually in adding relationship with said third potential during a cycle of variation of said third potential means, recording means, means providing a synchronizing pulse signal to said recording means at the start of each cycle of said third potential, means for receiving said resultant signals and delivering a signal to said recording means upon the occurrence of a substantially zero resultant signal.

4. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, said means providing an exciting current including an oscillator and a current electrode for delivering the oscillator output to the earth, said means providing said first and second potentials including an electrode for deriving a potential from the earth in the vicinity of the apparatus, means providing a third potential which varies cyclically and has, during each cycle of variation, the same predetermined wave form, means for adding said first and second potentials individually in opposed relationship with said third potential to provide a resultant signal having magnitude which passes through a substantially zero value during said cycle of variation, said adding means including means for sequentally connecting said first and second potentials in adding relationship with said third potential during a cycle of variation of said third potential means, recording means, means providing a synchronizing pulse signal to said recording means at the start of each cycle of said third potential, means for receiving said resultant signals and delivering a signal to said recording means upon the occurrence of a substantially zero resultant signal.

5. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle, the same predetermined wave form, said means for providing said third potential comprising a potentiometer having a contact moving at a substantially constant speed during each cycle, means for adding said first and second potentials individually in opposed relationship with said third potential to provide a resultant signal having magnitude which passes through a substantially zero value during said cycle, said adding means including means for sequentially connecting said first and second potentials in adding relationship with said third potential during a cycle of said third potential means, recording means, means providing a synchronizing pulse signal to said recording means at the start of each cycle of said third potential, means for receiving said resultant signals and delivering a signal to said recording means upon the occurrence of a substantially zero resultant signal.

6. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, said means providing an exciting current including an oscillator and a current electrode for delivering the oscillator output to the earth, said means providing said first and second potentials including an electrode for deriving a potential from the earth in the vicinity of the apparatus, means providing a third potential which varies cyclically and has, during each cycle, the same predetermined wave form, said means for providing said third potential comprising a potentiometer having a contact moving at a substantially constant speed during each cycle, means for adding said first and second potentials individually in opposed relationship with said third potential to provide a resultant signal having magnitude which passes through a substantially zero value during said cycle, said adding means including means for sequentially connecting said first and second potentials in adding relationship with said third potential during a cycle of said third potential means, recording means, means providing a synchronizing pulse signal to said recording means at the start of each cycle of said third potential, means for receiving said resultant signals and delivering a signal to said recording means upon the occurrence of a substantially zero resultant signal.

7. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, said means providing an exciting current including an oscillator and a current electrode for delivering the oscillator output to the earth, said means providing said first and second potentials including an electrode for deriving a potential from the earth in the vicinity of the apparatus, means providing a third potential which varies cyclically and has, during each cycle, the same predetermined wave form, said means for providing said third potential comprising a potentiometer having a contact moving at a substantially constant speed during each cycle, means connecting the output of said oscillator to said potentiometer, said frequency of said oscillator being substantially greater than the rate of variation of said third potential, means for adding said first and second potential individually in opposed relationship with said third potential to provide a resultant signal having magnitude which passes through a substantially zero value during said cycle, said adding means including means for sequentially connecting said first and second potentials in adding relationship with said third potential during a cycle of said third potential means, recording means, means providing a synchronizing pulse signal to said recording means at the start of each cycle of said third potential, means for receiving said resultant signals and delivering a signal to said recording means upon the occurrence of a substantially zero resultant signal.

8. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, said means providing an exciting current including an oscillator and a current electrode for delivering the oscillator output to the earth, said means providing said first and second potentials including an electrode for deriving a potential from the earth in the vicinity of the apparatus, means providing a third potential which varies cyclically and has, during each cycle, the same predetermined wave form, means providing a fourth potential which varies cyclically and has, during each cycle, the same predetermined wave form, said means for providing said third and fourth potentials comprising a potentiometer having a contact moving at a substantially constant speed during each cycle, means for selectively adding said first or said second potential individually in opposed relationship with either said third or said fourth potential during a cycle, to provide a resultant signal having magnitude which passes through a substantially zero value during said cycle, recording means, means providing a synchronizing pulse signal to said recording means at the start of each cycle, means for receiving said resultant signals and delivering a signal to said recording means upon the occurrence of a substantially zero resultant signal, means for chopping said resultant signal including means for selectively connecting said oscillator output to said chopping means.

9. Apparatus for the logging of bore holes comprising means for providing an exciting current to the earth in the vicinity of the apparatus, means providing a first potential responsive to said exciting current, means providing a second potential responsive to said exciting current, said potentials being derived from the earth in the vicinity of the apparatus, means providing a third potential which varies cyclically and has, during each cycle, the same predetermined wave form proportional to said exciting current, recording means having an input terminal and including a recording head, means for receiving an input signal from said input terminal and delivering a recording signal to said recording head upon the occurrence of a substantially zero input signal, means for adding said first and second potentials individually in opposed relationship with said third potential to provide a resultant signal having a magnitude which passes through a substantially zero value during said cycle, said adding means including circuit means connecting said first potential to said input terminal including a first switch serially connected therein, circuit means connecting said second potential to said input terminal having a second switch serially connected therein, circuit means connecting said third potential to said input terminal having a third switch serially connected therein, and means for controlling the position of said switches to sequentially close said first and third switches during a first period of operation and said second and third switches during a subsequent period of operation and for repeating said sequential periods of operation whereby a multiplexed record is produced.

10. Apparatus as claimed in claim 9 including means for providing a synchronizing pulse to said recording head at the start of said third potential cycle including a fourth switch operable to a closed position by said controlling means during each period of operation.

11. Apparatus for the reproduction of a single channel multiplexed bore hole log record composed of synchronizing pulses and measuring pulses, comprising means for picking up the pulse signals on the log record, a sawtooth generator, means controlled by the synchronizing pulses on the log record to deliver a control pulse to initiate sweep of said sawtooth generator and controlled by the measuring pulses on the log record for delivering sampling pulses, means responsive to said sampling pulses for sampling the output of said generator, and means for recording the sampled output of said generator, said sampling means including circuit means for connecting the output of said generator to said recording means through a plurality of different circuit paths, one path being provided for each repeated multiplexed measurement on the log record, each of said paths having a control switch serially connected therein, and a control circuit for each of said paths having means for closing the control switch thereof, and stepping switch means for directing a sampling pulse to one of said control circuits, said stepping switch being responsive to said synchronizing pulses for sequentially connecting said sampling pulse to one of said control circuits.

12. Apparatus for the reproduction of a single channel multiplexed bore hole log record composed of synchronizing pulses and measuring pulses, comprising means for picking up the pulse signals on the log record, a sawtooth generator, means controlled by the synchronizing pulses on the log record to deliver a control pulse to initiate sweep of said sawtooth generator and controlled by the measuring pulses on the log record for delivering sampling pulses, means responsive to said sampling pulses for sampling the output of said generator, and means for recording the sampled output of said generator including a galvanometer for providing a visual indication of the amplitude of the sampled output of said generator, said sampling means including circuit means for connecting the output of said generator to said recording means through a plurality of different circuit paths, one path being provided for each repeated multiplexed measurement on the log record, each of said paths having a control switch serially connected therein, and a control circuit for each of said paths having means for closing the control switch thereof, and stepping switch means for directing a sampling pulse to one of said control circuits, said stepping switch being responsive to said synchronizing pulses for sequentially connecting said sampling pulse to one of said control circuits.

13. Apparatus for the reproduction of a record from a single channel multiplexed bore hole log record composed of synchronizing pulses and measuring pulses comprising means for picking up the pulse signals on the log record, a sawtooth generator, means controlled by the synchronizing pulses on the log record to deliver a control pulse to initiate sweep of said sawtooth generator and controlled by the measuring pulses on the log record for delivering of sampling pulses, means responsive to said sampling pulses for sampling the output of said generator, and means for recording the sampled output of said generator, said sampling means including circuit means connecting the output of said generator to said recording means through a plurality of different circuits, one circuit being provided for each repeated multiplexed measurement on the log record, and means for sequentially connecting each of said circuits to said recording means in response to said control and sampling pulses.

14. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle the same predetermined wave form, means for adding said first and second potentials individually in opposed relationship with said third potential to provide a resultant signal having magnitude which passes through a substantially zero value during said cycle, said adding means including means for sequentialy connecting said first and second potentials in adding relationship with said third potential during a cycle of said third potential means, recording means, means providing a synchronizing pulse signal to said recording means at the start of each cycle of said third potential, means for receiving said resultant signals and delivering a signal to said recording means upon the occurrence of a substantially zero resultant signal whereby a single channel multiplexed time pulse modulated bore hole log record comprising synchronizing pulses and measuring pulses is produced, and means for reproducing said log record in the form of a variable amplitude log.

15. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle, the same predetermined wave form, means for adding said first and second potentials individually in opposed relationship with said third potential to provide a resultant signal having magnitude which passes through a substantially zero value during said cycle, said adding means including means for sequentially connecting said first and second potentials in adding relationship with said third potential during a cycle of said third potential means, recording means, means providing a synchronizing pulse signal to said recording means at the start of each cycle of said third potential, means for receiving said resultant signals and delivering a signal to said recording means upon the occurrence of a substantially zero resultant signal whereby a single channel multiplexed bore hole log record comprising synchronizing pulses and measuring pulses is produced, and means for reproducing said log record in the form of a variable amplitude log, said reproducing means comprising means for picking up the log signals from said logging record, a sawtooth generator, means for initiating sweep of said generator in response to said synchronizing pulses, and means for sampling the output of said generator at a time when said measuring pulses are being picked up by said pickup means.

16. Apparatus as claimed in claim 15 wherein said reproducing means comprises a galvanometer for providing a visual indication of the amplitude of the sampled output of said generator.

17. Apparatus for the logging of bore holes comprising means for providing an exciting current to the earth in the vicinity of the apparatus, means for providing a first potential responsive to said exciting current, means providing a second potential responsive to said exciting current, said potentials being derived from the earth in the vicinity of the apparatus, means providing a third potential which varies cyclically and has, during each cycle, the same predetermined wave form, means for adding said first and second potentials individually in opposed relationship with said third potential to provide a resultant signal having magnitude which passes through a substantially zero value during said cycle, said adding means including means for sequentially connecting said first and second potentials in adding relationship with said third potential during a cycle of said third potential means, recording means, means providing a sychronizing pulse signal to said recording means at the start of each cycle of said third potential, means for receiving said resultant signals and delivering a signal to said recording means upon the occurrence of a substantially zero resultant signal whereby a single channel multiplexed bore hole record comprising synchronizing pulses and measuring pulses is produced, and means for reproducing said log record in the form of a variable amplitude log, said reproducing means comprising means for picking up the pulse signals on the log record, a sawtooth generator, means controlled by the synchronizing pulses on the log record to deliver a control pulse to initiate sweep of said sawtooth generator and means controlled by the measuring pulses on the log record for delivering of sampling pulses, means responsive to said sampling pulse for sampling the output of said generator, means for recording the sampled output of said generator, said sampling means including circuit means connecting the output of said generator to said recording means through a plurality of separate paths, one path being provided for each repeated multiplexed measurement on the log record, and means for sequentially connecting each of said paths to said recording means in response to said control and sampling pulses.

References Cited by the Examiner

UNITED STATES PATENTS

| | | | |
|---|---|---|---|
| 2,441,065 | 5/48 | Green | 324—10 X |
| 2,543,532 | 2/51 | Neufeld | 324—1 X |
| 2,754,475 | 7/56 | Norelius | 324—10 X |
| 2,816,959 | 12/57 | Segerstrom et al. | 340—183 X |
| 3,065,404 | 11/62 | Mayes et al. | 324—1 |

WALTER L. CARLSON, *Primary Examiner.*